(12) United States Patent
Zhang et al.

(10) Patent No.: US 9,157,397 B2
(45) Date of Patent: Oct. 13, 2015

(54) EXHAUST GAS INLET STRUCTURE OF AN EXHAUST GAS RECIRCULATION COOLER

(75) Inventors: Wenfeng Zhang, Tiantai County (CN); Xiaojun Qin, Tiantai County (CN); Zhao Youqi, Tiantai County (CN); Hao Liu, Tiantai County (CN)

(73) Assignee: ZHEJIANG YINLUN MACHINERY CO., LTD., Tiantai County, Zhejiang Province (CN)

( * ) Notice: Subject to any disclaimer, the term of this patent is extended or adjusted under 35 U.S.C. 154(b) by 0 days.

(21) Appl. No.: 14/110,116

(22) PCT Filed: Sep. 11, 2012

(86) PCT No.: PCT/CN2012/081228
§ 371 (c)(1),
(2), (4) Date: Jun. 23, 2014

(87) PCT Pub. No.: WO2013/170559
PCT Pub. Date: Nov. 21, 2013

(65) Prior Publication Data
US 2014/0299115 A1   Oct. 9, 2014

(30) Foreign Application Priority Data
May 15, 2012 (CN) .......................... 2012 1 0150927

(51) Int. Cl.
*F02M 25/06* (2006.01)
*F02M 25/07* (2006.01)
(Continued)

(52) U.S. Cl.
CPC ............ *F02M 25/0726* (2013.01); *F02M 25/07* (2013.01); *F28D 7/00* (2013.01); *F28F 9/02* (2013.01); *Y02T 10/121* (2013.01)

(58) Field of Classification Search
CPC .............. F02M 25/07; F02M 25/0726; F02M 25/0731; F02M 25/0734; F02M 25/0737; F28F 9/02; F28F 9/0239; F28F 9/0241; F28F 9/0248; F28F 1/08; F28F 2265/26; Y02T 10/121; F28D 7/1684; F28D 21/0003

USPC ...................................................... 123/568.12
See application file for complete search history.

(56) References Cited

U.S. PATENT DOCUMENTS 6,390,186 B1 *   5/2002  Laudic et al. ................. 165/158
2003/0047171 A1 *   3/2003  Vaughan et al. .......... 123/568.12
(Continued)

FOREIGN PATENT DOCUMENTS

CN         1761809 A      4/2006
CN       202039976 U     11/2011
(Continued)

*Primary Examiner* — Hung Q Nguyen
(74) *Attorney, Agent, or Firm* — Jacobson Holman PLLC; Jiwen Chen

(57) ABSTRACT

The present invention discloses an exhaust gas inlet structure of an exhaust gas recirculation (EGR) Cooler which includes a water shell, a gas inlet pipe, a bellow, an insulated pipe, an inlet chamber, a pre-cooling water chamber and a main board. The water shell is equipped with a water inlet pipe. Its main feature is the insulated pipe is placed within the bellow and connected with the gas inlet pipe at one end while the other end is suspended. The large-bore end of the inlet chamber is connected with the main board to form a gas inlet cavity while leaving a space to form a coolant channel between the joining part and the water shell. An external surface of a middle pipe body connects to the bellow to form a pre-cooling cavity connected to the coolant channel. The advantages of the present invention are as follow: newly-added pre-cooling water chamber reduces the wall temperature of the main board and the inlet chamber; newly-added supporting in the middle part of the insulated pipe improves the vibration-proof function of the insulated pipe; the special structure of the inlet chamber increases the ability of the axial displacement compensation. The above-mentioned improvement of the present invention significantly improves the reliability of the EGR cooler.

9 Claims, 4 Drawing Sheets

(51) Int. Cl.
*F28F 9/02* (2006.01)
*F28D 7/00* (2006.01)

(56) References Cited

U.S. PATENT DOCUMENTS

2010/0083646 A1* 4/2010 Poppe .............................. 60/311

2011/0308778 A1* 12/2011 Tsuda et al. .................. 165/157

FOREIGN PATENT DOCUMENTS

| CN | 102333949 A | 1/2012 |
| JP | 2010223193 A | 10/2010 |
| WO | WO2009022113 A1 | 2/2009 |

* cited by examiner

EXHAUST GAS INLET STRUCTURE OF AN EXHAUST GAS RECIRCULATION COOLER

This is a U.S. national stage application of PCT Application No. PCT/US2012/081228 under 35 U.S.C. 371, filed Sep. 11, 2012 in Chinese, claiming the priority benefit of Chinese Application No. 2012101509274, filed May 15, 2012, which is hereby incorporated by reference.

FIELD OF THE INVENTION

The present invention belongs to the field of heat exchanger technology, involving structure form and structure reliability improvements of an engine exhaust gas recirculation cooler, more specifically, relates to an exhaust gas inlet structure of an exhaust gas recirculation (EGR) cooler.

BACKGROUND OF THE INVENTION

Exhaust gas recirculation technology is one of the main technologies for engines to achieve emission above national standard No. 4. Before recirculation entering an engine cylinder, exhaust gas shall pass through the EGR cooler to cool to a specific temperature. The working temperature of the EGR cooler at its heat side of high-temperature exhaust gas is usually 120° C.-30° C. and 80° C.-120° C. at its cool side of coolant. Therefore, during its working process, the wall temperature of the cooler pipes will be relatively high and the longitudinal thermal expansion will result in the deformation at the joint of cooling pipe and the main board, rendering the joint ineffective. The temperature at the exhaust gas inlet is usually 500° C.-730° C. Usually, the internal side of the inlet chamber directly contacts exhaust gas while the external side contacts surrounding air which results in that the temperature of the inside wall of the inlet chamber can reach 400° C.-600° C. The inlet side of the main board is under the direct impact of the high-temperature exhaust gas while the other side contacts the coolant. However, the highest temperature of the wall of the main board will reach 400° C.-600° C. as well. The deformation of the inlet chamber and main board caused by high temperature is another important reason for the ineffectiveness of the EGR cooler. Usually, the surrounding of the main board of the EGR cooler will be connected to the inlet chamber and water shell. When the inlet chamber and main board witness high-temperature horizontal thermal expansion, they will be constrained by the water shell with lower temperature which causes deformation. Severe deformation usually renders the EGR cooler ineffective. Therefore, reducing the wall temperature of the EGR coolers and releasing thermal expansion can be an effective solution to increase the reliability of the EGR coolers. Moreover, considering the design that the inner insulated pipe of the bellow of the gas inlet pipe is fixed to the inlet pipe only at one end, if the insulated pipe is relatively long, the vibration during operation will render the bellow or the insulated pipe ineffective.

SUMMARY OF THE INVENTION

The present invention is aimed to deal with the above-mentioned problem, providing an improved exhaust gas inlet structure suitable for an EGR cooler of an engine and significantly increasing the reliability of the EGR cooler.

It is achieved by the following technology schemes:

An exhaust gas inlet structure of the EGR Cooler comprises a water shell, a gas inlet pipe, a bellow, an insulated pipe an inlet chamber, a pre-cooling water chamber and a main board, the water shell is equipped with the water inlet pipe, characterized in that the gas inlet pipe, the bellow, the pre-cooling water chamber and the water shell are connected in sequence, the insulated pipe is placed within the bellow and connected with the gas inlet pipe at one end while the other end is suspended; the inlet chamber is a two-grade reducing pipe including a large-bore end, a middle pipe body and a small-bore end, the large-bore end is connected with the main board to form a gas inlet cavity while leaving a space to form a coolant channel between the joining part and the water shell; the external surface of the middle pipe body connects to the bellow and/or the end of pre-cooling water chamber to form a pre-cooling cavity connected to the coolant channel; the small-bore end contacts an external surface of a middle part of the insulated pipe.

The exhaust gas inlet structure of the EGR cooler according to the present invention has the following beneficial effects:

1. The transitional step plane between the middle pipe body and the large-bore end of the inlet chamber of the EGR cooler has certain axial displacement compensation function, which is able to make up for the axial displacement caused by axial thermal expansion of the EGR cooler during operation.

2. After the connection of the periphery of the main board and the inlet chamber, a space is spared between the joining part and the water shell to form a coolant channel of the pre-cooling cavity. The periphery of the main board is not constrained by the water shell, being able to meet the demand of the horizontal thermal expansion of the main board.

3. The internal surface of the small-bore end of the inlet chamber of the EGR cooler contacts the middle part of the insulated pipe but is not fixed, supporting the insulated pipe in the radial direction and enabling the sliding movement in the axle direction, thus the vibration-proof function of the insulated pipe is improved which can be protective to the insulated pipe and bellow.

4. The exhaust gas inlet of the EGR cooler has the structure that the bellow is connected to the pre-cooling water chamber and the gas inlet pipe, therefore it has the displacement compensation function to a relatively large extent and meets the demand of displacement compensation caused by thermal expansion of the inlet pipe.

5. The newly-added pre-cooling water chamber reduces the wall temperature of the main board and the inlet chamber, significantly improving the reliability of the EGR cooler.

As a further improvement of the present invention, an expansion joint designed at the middle part of the inlet chamber can add the compensation value of the axial displacement, making it better meet the displacement compensation of the thermal expansion during the working process.

As a still further improvement of the present invention, the suspended end of the insulated pipe is flared (bellmouthed), which improves the air flow.

As a still further improvement of the present invention, the bellow is of a double-layer structure, and the two layers contact with each other without being welded. The single-layer bellow is 0.25-0.6 mm thick with 5-10 nodes and 6-12 mm high. The double-layer structure of the bellow can improve the connection strength of the bellow.

As a still further improvement of the present invention, the water inlet pipe of the EGR cooler is placed near the main board enabling the coolant to fully enter the pre-cooling cavity to directly cool the main board and the external surface of the inlet chamber, reduce the wall temperature of the main board and inlet chamber and decrease thermal expansion and deformation.

The present invention also provides a differently organized exhaust gas inlet structure of the EGR cooler comprising a water shell, a gas inlet pipe, an insulated pipe, an inlet chamber, a pre-cooling water chamber and a main board, the water shell is equipped with the water inlet pipe, characterized in that the two ends of the pre-cooling water chamber are connected to the gas inlet pipe and water shell, the insulated pipe is placed within the pre-cooling water chamber and connected with the gas inlet pipe at one end while the other end is suspended, the inlet chamber is an one-grade reducing pipe including a large-bore end and a small-bore end, the large-bore end is connected with the main board to form a gas inlet cavity while leaving a space to form a coolant channel between the joining part and the water shell, the external surface of the small-bore end connects to the end of the pre-cooling water chamber to form a pre-cooling cavity connected to the coolant channel.

The above-mentioned exhaust gas inlet structure of the EGR cooler provided by the present invention features the newly-added pre-cooling water chamber to decrease the wall temperature of the main board and inlet chamber, the newly-added supporting in the middle part of the insulated pipe to improve the vibration-proof performance and the special structure of the inlet chamber to increase the axial thermal expansion displacement compensation inside the EGR cooler. The improvements have significantly improved the reliability of the EGR cooler.

Figure 1:
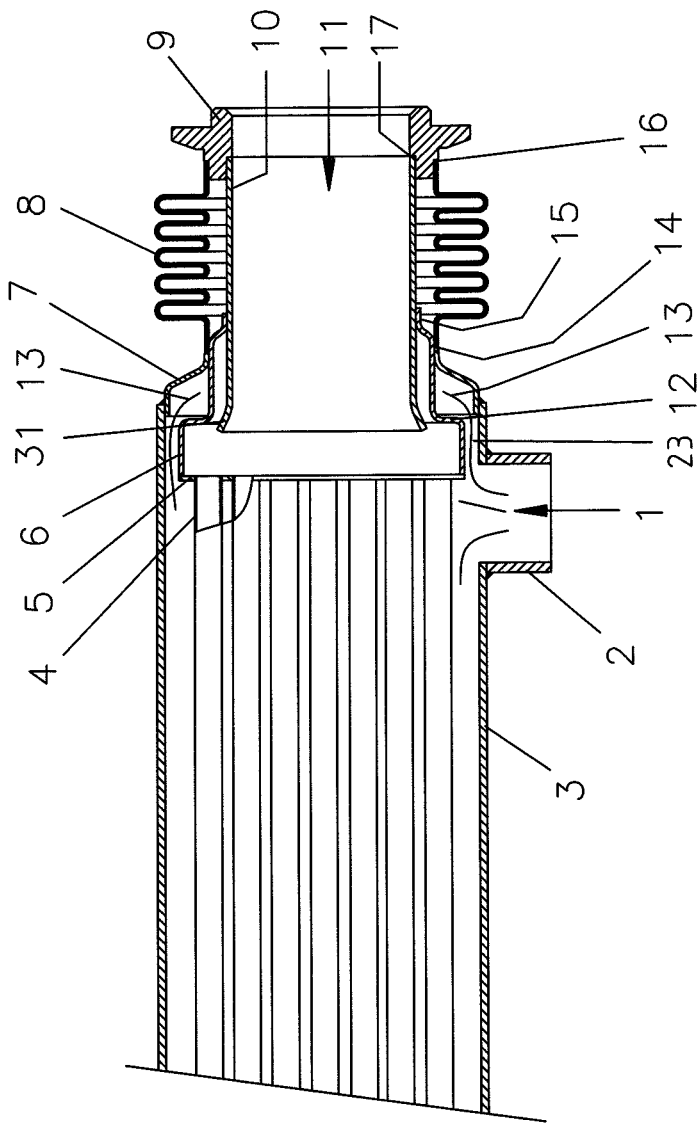
FIG. 1 shows the overall structure of the first embodiment of the exhaust gas inlet of the EGR cooler of the present invention.

In the drawings,
1—water inlet,
2—water inlet pipe,
3—water shell,
4—, 5—heat dissipation core,
5—main board,
6—inlet chamber,
7—pre-cooling water chamber,
8—bellow,
9—gas inlet pipe,
10—insulated pipe,
11—gas intake,
12—step plane,
13—pre-cooling cavity,
14—middle pipe body of the inlet chamber,
15—small-core end of the inlet chamber,
16—one end of the bellow,
18—circular pipe,
20—square pipe,
21—expansion joint,
22—large-core end of the inlet chamber,
23—coolant channel,
24—gas inlet cavity,
31—flared opening of the insulated pipe,
50—insulated pipe,
51—flared opening,
52—step plane of the inlet chamber,
53—large-core end of the inlet chamber,
54—small-core end of the inlet chamber,
55—main board,
56—inlet chamber,
57—pre-cooling water chamber,
59—air inlet pipe,
63—gas inlet cavity,
64—coolant channel,
65—pre-cooling cavity.

DETAILED DESCRIPTION OF A PREFERRED EMBODIMENT

A further description of the present invention with specific embodiment will be given below with reference to the drawings.

Figure 2:
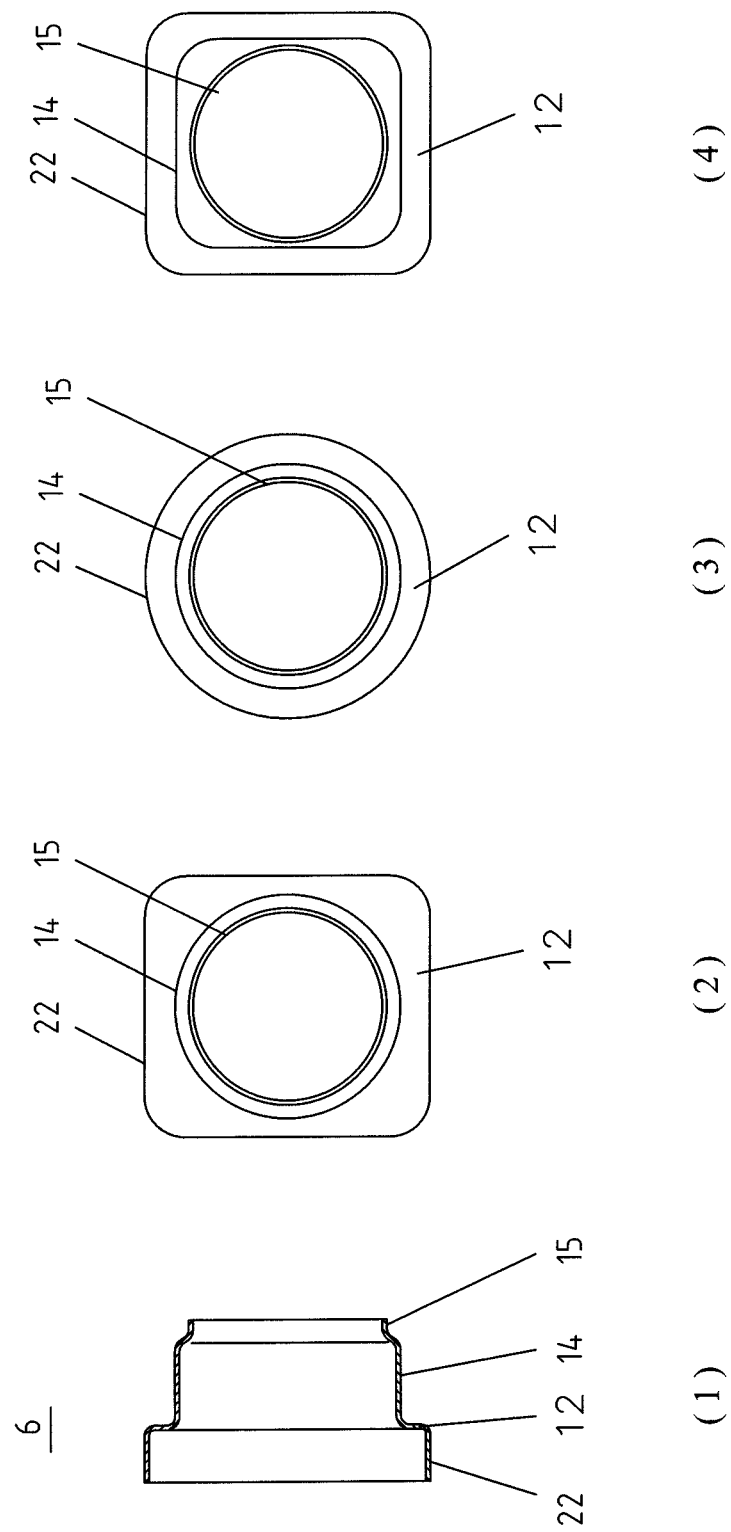
FIG. 2 shows the inlet chamber structure of the embodiment in FIG. 1, of which FIG. 2(1) is the cutaway view and FIGS. 2(2), (3) and (4) are the right elevation of different cross-section shapes.

With reference to FIG. 1 and FIG. 2, the exhaust gas inlet structure of the EGR cooler of the present invention includes a water shell 3, a gas inlet pipe 9, a bellow 8, an insulated pipe 10, an inlet chamber 6, a pre-cooling water chamber 7 and a main board 5. The water shell 3 is equipped with a water inlet pipe 2 and a core 4 within, one end of which is connected to the main board 5. The gas inlet pipe 9, bellow 8, pre-cooling water chamber 7 and water shell 3 are connected with a brazing or an argon arc welding in sequence. The insulated pipe 10 is placed within the bellow 8 and welded with the gas inlet pipe 9 at one end while the other end is suspended. The gas inlet chamber 6 is a two-grade reducing pipe including a large-bore end 22, a middle pipe body 14 and a small-bore end 15. The large-bore end 22 is welded with the main board 5 to form a gas inlet cavity 24 while leaving a space to form a coolant channel 23 between the joining part and the water shell 3. The external surface of the middle pipe body 14 is welded to the bellow 8 and the end of the pre-cooling water chamber 7 to form the pre-cooling cavity 13 connected to the coolant channel 23. The small-bore end 15 contacts the external surface of the middle part of the insulated pipe 10 but is not fixed. The small-bore end of the inlet chamber 6 supports the insulated pipe 10 in the radial direction while it can still relatively slide in the axial direction.

The suspended end of the insulated pipe 10 is a flared opening 31 which improves the air flow.

The bellow 8 is of a double-layer structure, and the two layers contact with each other without being welded. The single-layer bellow is 0.25-0.6 mm thick with 5-10 nodes and 6-12 mm high. The double-layer structure of the bellow can improve the connection strength of the bellow.

The water inlet 2 is placed near the main board 5 enabling the coolant to fully enter the pre-cooling cavity 7 to directly cool the main board 5 and the external surface of the inlet chamber 6, reduce the wall temperature of the main board 5 and inlet chamber 6 and decrease thermal expansion and deformation.

The above-captioned exhaust gas inlet structure of the EGR cooler suitable for engines of the present invention comprises a gas inlet pipe unit, a gas inlet cavity and a pre-cooling cavity, wherein the gas inlet pipe 9, the two-layer bellow 8 and the insulated pipe 10 constitute the gas inlet pipe unit; the periphery of the main board 5 is welded to the large-bore end of the inlet chamber 6 and then form the gas inlet cavity 24 in the inlet chamber 6; the inlet chamber 6 is welded to the pre-cooling water chamber 7 to form the pre-cooling cavity between the external surface of inlet chamber 6 and the internal surface of the pre-cooling water chamber 7. Meanwhile, after the connection of the pre-cooling water chamber 7 to the water shell 3, the coolant channel 23 is formed between the large-bore end of the inlet chamber 22 and the periphery of the main board and the water shell.

As FIG. 2 shows, the large-bore end 22 of the inlet chamber 6 is square (as shown in FIGS. 2(2) and 2(4)) or round (as shown in FIG. 2(3)). The cross section of the middle pipe body 14 of the inlet chamber 6 is square (as shown in FIG. 2(4)) or round (as shown in FIGS. 2(2) and 2(3)). The small-bore end 15 of the inlet chamber 6 is round. The large-bore end 22 and the middle pipe body 14 of the inlet chamber 6 are connected with each other through a step plane 12.

Figure 3:
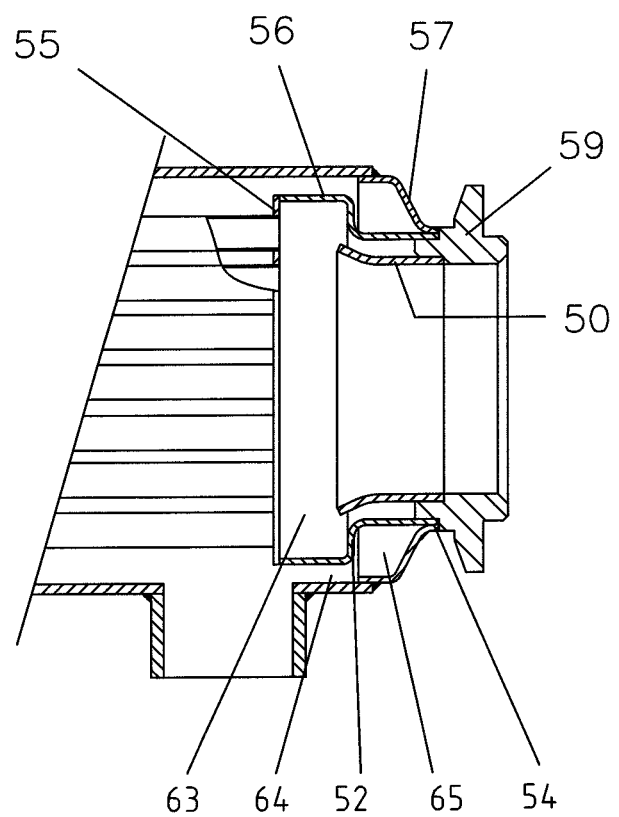
FIG. 3 shows the overall structure of another embodiment of the exhaust gas inlet of the EGR cooler of the present invention.
Figure 4:
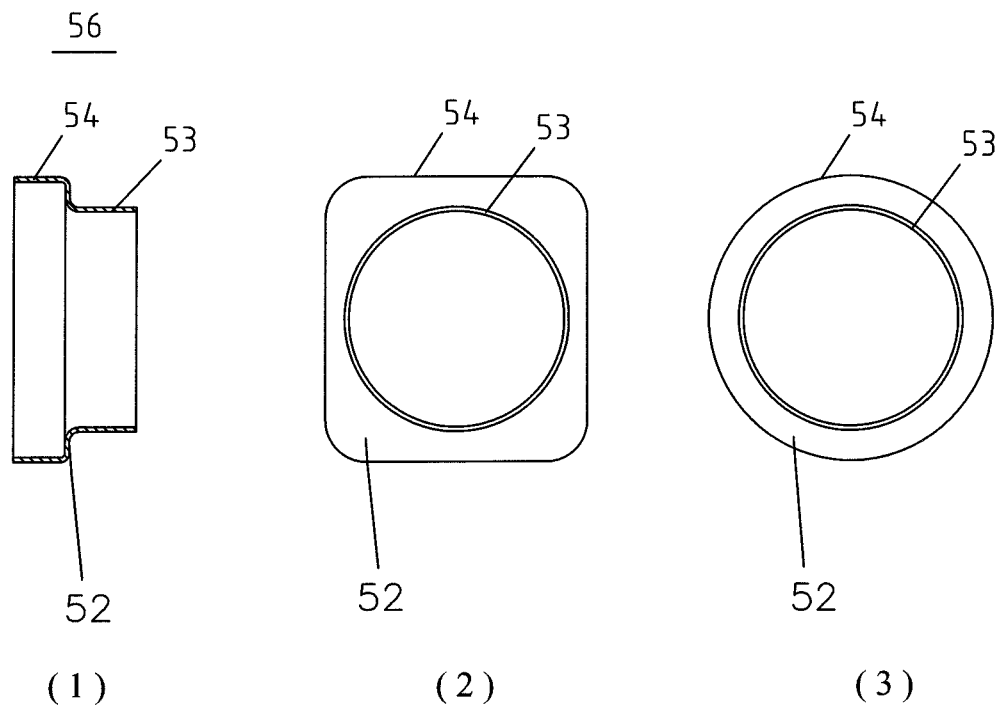
FIG. 4 shows the inlet chamber structure of the embodiment in FIG. 3, of which FIG. 3(1) is the cutaway view and FIGS. 3(2), (3) and (4) are the right elevation of different cross-section shapes.

As FIG. 3 shows, another exhaust gas inlet structure of the EGR cooler of the present invention which, includes a water shell 3, a gas inlet pipe 5, an insulated pipe 50, an inlet chamber 56, a pre-cooling water chamber 57 and a main board 55. The aforesaid water shell 53 is equipped with a water inlet pipe 52. The two ends of the pre-cooling water chamber 57 are separately connected to the gas inlet pipe 5 and the water shell 3. The insulated pipe 50 is placed within the pre-cooling water chamber 57 and connected with the gas inlet pipe 5 at one end while the other end is suspended with a flared opening 51. The inlet chamber 56 is a one-grade reducing pipe including a large-bore end 53 and a small-bore end 54. The large-bore end 53 is connected with the main board 55 to form an inlet cavity 63 while leaving a space to form a coolant channel 64 between the joining part and the water shell 53. The external surface of the small-bore end 54 is connected to the end of the pre-cooling water chamber 57 to form the pre-cooling cavity 65 connected to the coolant channel 64. As FIG. 4 shows, the large-bore end 53 of the inlet chamber 56 is square (as shown in FIG. 4(2)) or round (as shown in FIG. 4(3)). The small-bore end 54 of the inlet chamber 56 is round. The large-bore end 53 and the small-bore end 54 of the inlet chamber 56 are transitionally connected with each other through a step plane 52.

Figure 5:
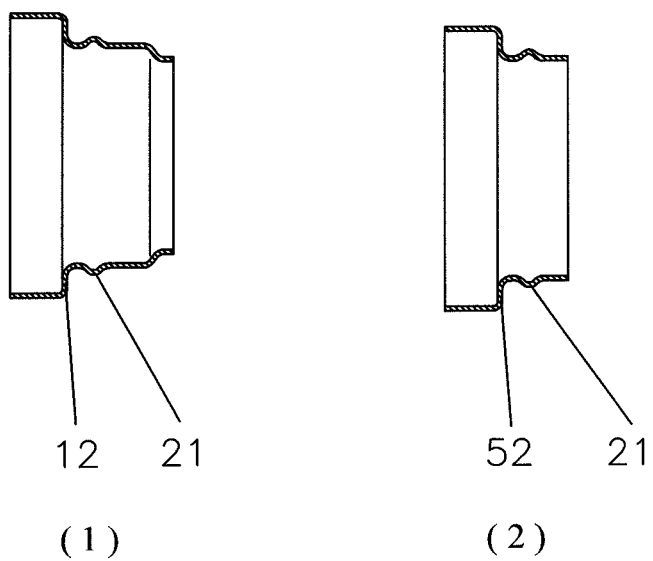
FIG. 5 shows the inlet chamber structure with expansion joint of the exhaust gas inlet of the EGR cooler of the present invention, of which FIG. 5(1) shows the two-grade reducing pipe and FIG. 5(2) shows the one-grade reducing pipe.

As FIG. 5 shows, the expansion joint 21 is designed at the middle of the inlet chamber 6 and the inlet chamber 56.

It should be understood that the present invention is not limited by the embodiments described above which are presented as an explanation only but can be modified in various ways within the spirit and scope of protection defined by the present invention.

The invention claimed is:

1. An exhaust gas inlet structure of an exhaust gas recirculation (EGR) cooler comprising a water shell, a gas inlet pipe, a bellow, an insulated pipe, an inlet chamber, a pre-cooling water chamber and a main board, the water shell is equipped with a water inlet pipe, characterized in that the gas inlet pipe, the bellow, the pre-cooling water chamber and the water shell are connected in sequence; the insulated pipe is placed within the bellow and connected with the gas inlet pipe at one end while the other end is suspended; the inlet chamber is a two-grade reducing pipe including a large-bore end, a middle pipe body and a small-bore end, the large-bore end is connected with the main board to form a gas inlet cavity while leaving a space to form a coolant channel between the jointing part and the water shell; an external surface of the middle pipe body connects to the bellow and/or an end of pre-cooling water chamber to form a pre-cooling cavity connected to the coolant channel; the small-bore end contacts an external surface of a middle part of the insulated pipe.

2. The exhaust gas inlet structure of the EGR cooler according to claim 1, wherein an expansion joint designed at a middle pipe body of the inlet chamber.

3. The exhaust gas inlet structure of the EGR cooler according to claim 1, wherein a cross section of the inlet chamber is round or square tube structure, the middle pipe body and the large-bore end of the inlet chamber are connected with each other through a step plane.

4. The exhaust gas inlet structure of the EGR cooler according to claim 1, wherein the suspended end of the insulated pipe has a flared opening.

5. The exhaust gas inlet structure of the EGR cooler according to claim 1, wherein the bellow is of a double-layer structure, and an inner layer and an outer layer contact with each other without being welded; a single-layer bellow is 0.25-0.6 mm thick with nodes and 6-12 mm high.

6. The exhaust gas inlet structure of the EGR cooler according to claim 1, wherein the water inlet pipe is placed near the main board.

7. An exhaust gas inlet structure of an exhaust gas recirculation cooler comprising a water shell, a gas inlet pipe, an insulated pipe, an inlet chamber, a pre-cooling water chamber and a main board, the water shell is equipped with a water inlet pipe, characterized in that two ends of the pre-cooling water chamber are connected to the gas inlet pipe and the water shell, the insulated pipe is placed within the pre-cooling water chamber and connected with the gas inlet pipe at one end while the other end is suspended, the inlet chamber is an one-grade reducing pipe including a large-bore end and a small-bore end, the large-bore end is connected with the main board to form a gas inlet cavity while leaving a space to form a coolant channel between the joint part and the water shell, an external surface of the small-bore end connects to the end of pre-cooling water chamber to form a pre-cooling cavity connected to the coolant channel.

8. The exhaust gas inlet structure of the EGR cooler according to claim 7, wherein a cross section of the inlet chamber is round or square tube structure, the small-bore end and the large-bore end of the inlet chamber are connected with each other through a step plane.

9. The exhaust gas inlet structure of the EGR cooler according to claim 7, wherein the suspended end of the insulated pipe has a flared opening.

\* \* \* \* \*